(12) United States Patent
Luo

(10) Patent No.: US 10,563,005 B2
(45) Date of Patent: Feb. 18, 2020

(54) AROMATIC POLYESTER POLYOL COMPOSITIONS

(71) Applicant: INVISTA NORTH AMERICA S.A.R.L., Wilmington, DE (US)

(72) Inventor: Ning Luo, Wilmington, NC (US)

(73) Assignee: INVISTA North America S.a.r.l., Wilmington, DE (US)

( * ) Notice: Subject to any disclaimer, the term of this patent is extended or adjusted under 35 U.S.C. 154(b) by 63 days.

(21) Appl. No.: 16/066,460

(22) PCT Filed: Dec. 30, 2016

(86) PCT No.: PCT/US2016/069448
§ 371 (c)(1),
(2) Date: Jun. 27, 2018

(87) PCT Pub. No.: WO2017/127224
PCT Pub. Date: Jul. 27, 2017

(65) Prior Publication Data
US 2019/0292303 A1    Sep. 26, 2019

Related U.S. Application Data

(60) Provisional application No. 62/281,232, filed on Jan. 21, 2016.

(51) Int. Cl.
*C08G 18/64* (2006.01)
*C08G 18/22* (2006.01)
(Continued)

(52) U.S. Cl.
CPC ....... *C08G 18/6492* (2013.01); *C08G 18/165* (2013.01); *C08G 18/225* (2013.01); *C08G 18/4219* (2013.01); *C08G 18/7664* (2013.01); *C08G 18/7671* (2013.01); *C08G 63/668* (2013.01); *C08L 67/02* (2013.01);
(Continued)

(58) Field of Classification Search
None
See application file for complete search history.

(56) References Cited

U.S. PATENT DOCUMENTS 6,025,452 A * 2/2000 Kurple ............... B22C 1/2273
                                                      523/142
2011/0195148 A1* 8/2011 Mentink ............ C08G 18/6484
                                                      426/3
(Continued)

FOREIGN PATENT DOCUMENTS

EP    2565226 A1 *  3/2013   ............ C08J 11/22
EP    2565226 A1     3/2013
(Continued)

OTHER PUBLICATIONS

International Search Report and Written Opinion received for PCT Application No. PCT/US2016/069448, dated May 15, 2017, 9 pages.
(Continued)

*Primary Examiner* — Peter A Salamon
(74) *Attorney, Agent, or Firm* — Invista North America S.A.R.L.

(57) ABSTRACT

The present disclosure relates to novel aromatic polyester polyol compositions comprising lignin as a major reactant that is suitable for producing polyurethane rigid foams and coatings.

19 Claims, 5 Drawing Sheets

(51) Int. Cl.
 *C08G 18/42* (2006.01)
 *C08G 18/76* (2006.01)
 *C08L 67/02* (2006.01)
 *C08G 63/668* (2006.01)
 *C08G 18/16* (2006.01)
 *C08G 101/00* (2006.01)
(52) U.S. Cl.
 CPC ............... *C08G 2101/0025* (2013.01); *C08G 2101/0083* (2013.01)

(56) References Cited

U.S. PATENT DOCUMENTS

| | | |
|---|---|---|
| 2013/0042659 A1 | 2/2013 | Beatty et al. |
| 2015/0259369 A1 | 9/2015 | Mckellar |
| 2016/0226114 A1* | 8/2016 | Hartmann .......... C08G 18/4854 |

FOREIGN PATENT DOCUMENTS

| | | |
|---|---|---|
| WO | 2016/028837 A1 | 2/2016 |
| WO | 2016/118411 A1 | 7/2016 |
| WO | 2017/127224 A1 | 7/2017 |

OTHER PUBLICATIONS

International Preliminary Report on Patentability received for PCT Application No. PCT/US2016/069448, dated Aug. 2, 2018, 8 pages.

* cited by examiner

AROMATIC POLYESTER POLYOL COMPOSITIONS

FIELD

The present disclosure relates to novel aromatic polyester polyol compositions comprising lignin as a major reactant that is suitable for producing cellular and non-cellular polyurethanes including rigid foams and coatings. More particularly, the foams prepared using the lignin-based aromatic polyester polyols demonstrate improved flame resistance and better char integrity, as observed in the furnace test (550° C./20 min).

BACKGROUND

Industrial lignin products are dark brown solids that are obtained as co-products of the manufacturing of cellulose pulp for paper and other recovery processes. As of 2010, the pulp and paper industry alone produced an estimated 50 million tons of extracted lignin. Only 2% of the production (one million ton) was commercially used for industrial products such as dispersing or binding agents; the rest was burnt as low-value fuel.

Chemically, lignin contains varied levels of aliphatic hydroxyl groups, phenolic hydroxyl groups and carboxyl groups that, in principle, can react with isocyanates to produce polyurethane materials. In order to utilize lignin for making polyurethanes the solid lignin needs to be converted into liquid. There are two major technologies to serve this purpose. One is to dissolve chemically unmodified lignin in polyols and the other is to modify lignin chemically with alkoxylation process, that is, to make lignin-based polyether polyols.

For dissolving lignin into polyols or polyol blends, both polyether polyols and polyester polyols have been used according to the available literature. One of the most commonly used polyol is polyethylene glycol (PEG) of molecular weight less than 1000 Dalton. In the blending process, aggressive mechanical mixing, for example, high-shear mixing, is used to obtain homogenous lignin/polyol liquids. Such lignin-based polyols have high acidity.

The problem with high acidity polyols has been the conversion of isocyanate to urethane decreases when reacted with increasing amount of lignin in the blends with polycaprolactone polyol of different molecular weight. Moreover, the reactivity between isocyanate and the lignin/polyol blend is dependent on the lignin type as well.

U.S. Pat. No. 6,025,452 teaches that the reactivity of the lignin/polyol mixture is controlled by the sodium concentration and the preferred sodium concentration is less than 1% by weight of the lignin.

United States Patent Application No. US2015/0259369A1 relates to a system and method for preparing chemically modified lignin.

Reactivity of polyol with isocyanates is of importance for the polyurethane rigid foam industry. Other than formulation factors, for example, catalyst type and concentration, the polyol reactivity is correlated with the types of hydroxyl groups, which include primary hydroxyl, stereo-hindered hydroxyl, aliphatic hydroxyl, or phenolic hydroxyl groups and the acidity of the polyol. The commercial acid number values for industrial polyols are less than 2 mg KOH/g in order to minimize the negative impact on reactivity and to ensure processing latitude in foam production.

Alkoxylation may be advantageous in converting hydroxyl and carboxyl groups at different locations in lignin molecules to (methyl) hydroxyethyl end-groups. In a typical alkoxylation process, lignin may be reacted with propylene oxide or ethylene oxide, or in a mixture form, with an alkali catalyst under high pressure and elevated temperature conditions. In an ideal alkoxylation process, the hydroxyl groups present in lignin molecules can be converted to 1-methyl hydroxyethyl groups or hydroxyethyl groups uniformly, which would improve the reactivity of the resultant lignin-based polyol. Also, by altering the ratio of lignin/propylene oxide or ethylene oxide, lignin polyol may be made with desired hydroxyl number and polyol viscosity.

Alkoxylation process is basically converting lignin into lignin-based polyether polyols that are similar to those conventional polyether polyols. Polyurethane rigid foams are also obtained from these lignin polyols with good physical properties.

The disadvantage of lignin alkoxylation process is the difficulty of handling toxic propylene oxide and ethylene oxide. Another disadvantage is that often times low polyol viscosity can be achieved only when large amount of propylene oxide or ethylene oxide is used. This significantly reduces the bio-based content in the final polyol and the advantage of using lignin as a raw material is lost.

Polyurethane rigid foams for thermal insulation applications are produced with aromatic polyester polyols as one of the key components. Aromatic polyester polyol is generally produced by esterification/transesterification reaction of aromatic acid source with glycols, for example, diethylene glycol, branch molecules, for example glycerin and pentaerythitol, and modifiers for example, fatty acid source. The lignin molecule contains varied kinds of hydroxyl groups and small amount of carboxylic acid species, which gives the potential as an alcohol-functional species for aromatic polyester polyol production. However, it has been an industrial problem that the reactant aromatic polyester polyols end up with the acid number higher than the acceptable range.

SUMMARY

Disclosed is an aromatic polyester polyol comprising lignin in the polyol backbone.

The disclosed aromatic polyester polyol contain from 0.5 to 30 weight percent lignin having an as-produced acid number of less than 2 mg KOH/g. For example, the disclosed aromatic polyester polyol has not been subjected to post-synthesis treatment to reduce its acid number. Disclosed aromatic polyester polyols can be produced without mechanically dispersing a discontinuous phase of solid lignin particles into a continuous phase of polyester polyol.

Disclosed is a process for making aromatic polyester polyol containing from 0.5 to 30 weight percent lignin comprising:
a) contacting a reaction mixture comprising:
  i) an aromatic acid source selected from the group consisting of terephthalic acid, isophthalic acid, phthalic anhydride, polyethylene terephthalate (PET) and mixtures thereof,
  ii) a glycol component selected from the group consisting of ethylene glycol, diethylene glycol, triethylene glycol, tetraethylene glycol, polyethylene glycol and their mixtures,
  iii) at least one selected from the group consisting of aliphatic diacids and hydroxyl-terminated aliphatic acids,
  iv) at least one functional reactant selected from glycerin, pentaerythritol, sorbitol, polyglycerin, tall oil fatty acids, vegetable oil triglycerides, monoester fatty acids, aliphatic diacids, hydroxyl aliphatic acids, and their mixtures, at temperature from 230° C. to 240° C. in the absence of lignin to form an intermediate reaction product mixture;

b) adding lignin, lignin incorporation catalyst and propylene carbonate to the reaction mixture of (a) and controlling the reaction temperature at 160° C. to 205° C.; and c) recovering lignin-containing aromatic polyester polyol from the reaction mixture.

The lignin-containing polyester polyol recovered in step (c) can have an as-produced acid number of less than 2 mg KOH/g.

The aromatic acid source can be a recycled material or an off-spec material.

The process can further comprise adding organic carbonate to step (a).

The process can further comprise adjusting temperature of the intermediate reaction product mixture to 160° C. to 205° C. before adding lignin, lignin incorporation catalyst and propylene carbonate.

The temperature range of step (b) can be from 170° C. to 180° C.

Step (c) can further comprises adding a glycol component selected from the group consisting of ethylene glycol, diethylene glycol, triethylene glycol, tetraethylene glycol, polyethylene glycol and their mixtures to reduce viscosity of the recovered material.

The added organic carbonate can be at least one selected from the group consisting of propylene carbonate, ethylene carbonate and glycerol carbonate. For example, the organic carbonate can be propylene carbonate.

The lignin incorporation catalyst can be selected from inorganic carbonates, metal oxides and mixtures thereof. For example, the inorganic carbonate can be an alkyl metal carbonate such as potassium carbonate or sodium carbonate. An example of a suitable metal oxide ligand incorporation catalyst is zinc oxide.

The lignin addition step (b) can comprise mixing 0.5 to 30 weight percent lignin (based on the weight of the finished lignin-containing polyester polyol) with the prepolymer of step (a).

Disclosed is an aromatic polyester polyol containing from 0.5 to 30 weight percent lignin having an as-produced acid number of less than 2 mg KOH/g. For example, disclosed are lignin-containing aromatic polyester polyols that are characterized by acid numbers of 2 and below without requiring post-synthesis treatment to reduce acid number.

Disclosed are aromatic polyester polyols that are produced without mechanically dispersing a discontinuous phase of solid lignin particles into a continuous phase of polyester polyol.

The disclosed lignin-containing aromatic polyester polyols are useful for making foams, including foams exhibiting improved flame resistance compared to a foam made from a similar aromatic polyester polyol that does not contain lignin.

DETAILED DESCRIPTION

Figure 1:
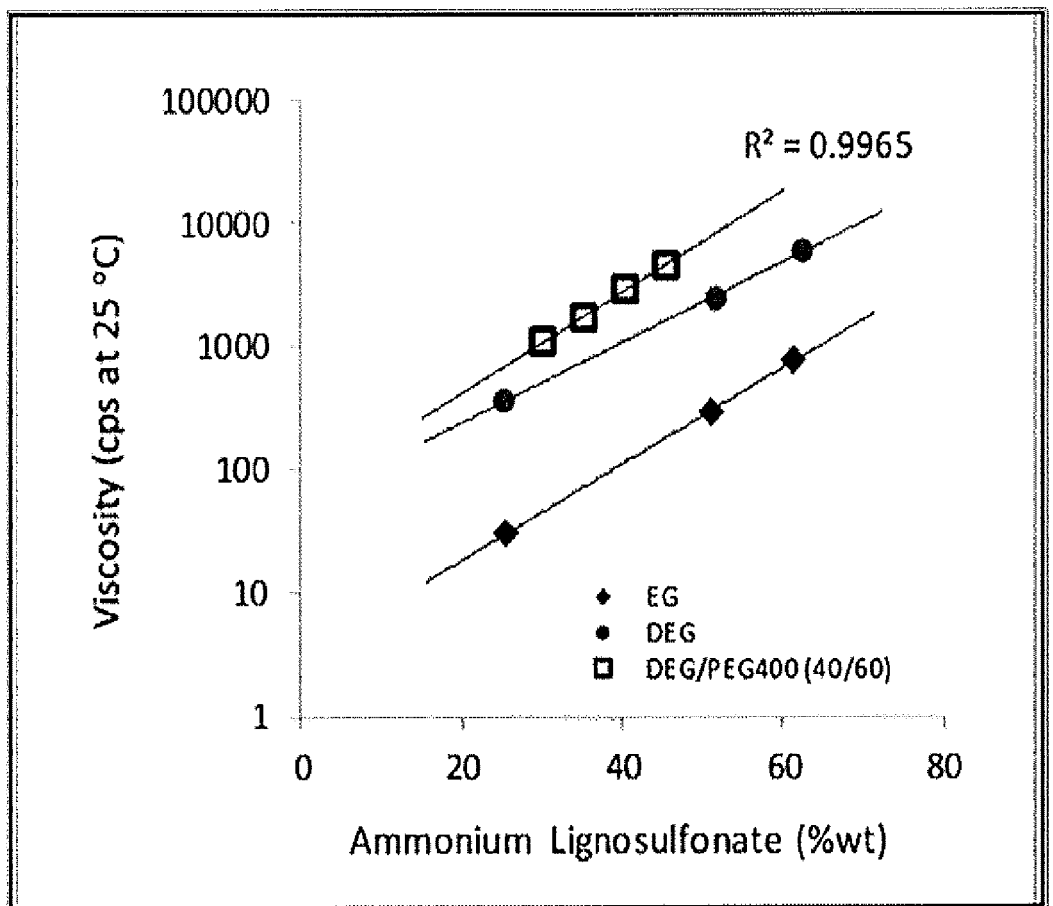
FIG. 1 represents the measured viscosity of ammonium lignosulfonate salts in glycol solutions on the y-axis as a function of lignin concentration on the x-axis, as detailed in Example 1.

The present disclosure relates to novel aromatic polyester polyol compositions comprising lignin as a major reactant that is suitable for producing cellular and non-cellular polyurethanes, for example, polyurethane rigid foams and coatings. More particularly, the foams prepared using the lignin-based aromatic polyester polyols demonstrate improved flame resistance and better char integrity in the furnace test (550° C./20 min).

In some embodiments of the present disclosure, the lignin-based polyol characteristics are low acidity, 100-800 mg KOH/g hydroxyl number range and 500-30000 cps viscosity at 25° C.

In some embodiments of the present disclosure, the method includes a step of reducing the acid number of polyol from above 5 mg KOH/g to less than 2 mg KOH/g, preferably to less than 1 mg KOH/g, at a reasonable reaction time scale by using an acid scavenger and catalyst at temperatures ranging from about 100° C. to about 200° C.

In some embodiments of the present disclosure, the polyols method may be accomplished in regular esterification/trans-esterification equipment without requiring high-shearing mixing. In other embodiments, the method may include a step that is able to reduce acid number of the lignin based aromatic polyester polyol at the temperature range of 100-200° C., preferably 140-200° C., and more preferably 150-190° C., and using an acid scavenger and catalyst.

In an embodiment of the present disclosure, lignin-based polyol can be made by dissolving lignin in polyether polyols or polyester polyols or the mixture of the two polyols at temperature between 70-100° C., then removing the water before adding the organic carbonate and the catalyst, adding the organic carbonate and catalyst followed by heating the reaction mixture to 150-200° C. in order to react lignin with the acid scavenger and the catalyst to result in a lignin-based polyol of low acidity.

In another embodiment of the present disclosure, lignin-based polyol can be made by reacting lignin with a reactive intermediate from the reaction of aromatic acid source, glycols, branch unit molecules, and modifiers at temperature between 150-230° C. In some embodiments, the reactive intermediate has high acid number at approximately 5-50 mg KOH/g, in most cases 10-40 mg KOH/g. Upon mixing in the lignin, the method according to the present disclosure may comprise—adding an organic carbonate at approximately 3-5 wt % concentration in the mixture together with a catalyst at 100-1000 ppm by weight concentration; reducing the reaction temperature to about 170-190° C.; observing an acid number reduction within 1-5 reaction hours to less than 3 mg KOH/g, preferably to less than 2 mg KOH/g, and more preferably to less than 1 mg KOH/g. The lignin-based aromatic polyester polyol, prepared according to the present disclosure, may be suitable for producing foamed polyurethanes, for example, rigid foams and non-foam polyurethane materials, for example, coatings of controlled-release fertilizers.

Lignin Solubility in Various Solvents

According to the present disclosure, initial solubility tests are performed to solubilize lignin, obtained from various suppliers, into different solvents. Experiments are conducted with ligninosulfonate salt (both sodium and ammonium salts) from Tembec (Canada), Organosolv lignin from ECN (Netherland), and Organosolv lignin from CIMV (France) with diethylene glycol and polyethylene glycol of molecular weight lower than 1000, used as solvents. A high shear mixing equipment would be preferred to make lignin/glycol solutions.

As shown in FIG. 1, the solubility tests show that the viscosity of the lignin/glycol solution increases with lignin concentration in the case of ammonium Lignosulfonate salts in ethylene glycol, diethylene glycol, and a mixture of diethylene glycol with PEG 400.

The lignin solubility tests reveal that the lignin products, in particular, Organosolv lignin from CIMV and the ammonium Lignosulfonate salt from Tembec, could not be solubilized in Terate® HT polyols. In tests involving Softwood Kraft lignin from Domtar (Plymouth, N.C.), Domtar lignin and other lignin products, SLRP™ lignin from the Liquid lignin Company (Clemson, S.C.) and HPL lignin from Cyclowood (Dallas, Tex.), the HPL lignin shows good solubility in organic solvents. Unexpectedly and surprisingly, these tests showed that the Softwood Kraft lignin from Domtar can be dissolved in glycols much quicker than the previously tested lignin products.

Further tests to solubilize the Softwood Kraft lignin (Domtar) in Terate® HT polyols at elevated temperature were successful without using high-shear mixing, and as described in Example 1 of the present disclosure. This surprising result allows for designing lignin-based aromatic polyester polyol compositions, as described in the present disclosure, without using high-shear mixing. This finding is particularly beneficial from an industrial viewpoint of a low-cost lignin replacement in polyols compositions without major equipment changes.

Another surprising fact is related to a reduction in the acid value in lignin-based aromatic polyester polyols compositions. After the lignin is solubilized into glycols, the lignin/glycol mixtures tend to have high acid number in the range of approximately 4 to 35 mg KOH/g depending on the type of lignin and dissolution procedure is used.

As described in Example 2, the acid number reduction from 7.50 mg KOH/g to 1.77 mg KOH/g was observed by using 31% of propylene carbonate as acid scavenger and 1.7% of zinc oxide as catalyst for 30% sodium Lignosulfonate salt in DEG/PEG 400 (40/60) mixture (See Example 2). In this particular example, a large amount of propylene carbonate is consumed.

In some embodiments, the acid value reduction was not as good during the process of making aromatic polyester polyols by means of regular esterification/transesterification chemistry. Various such approaches, as using urea, KOH, and ammonia to neutralize acids, did not result in acid value reduction for the polyol products. Also, unreasonably long reaction times were necessary to make acid value reduction to less than 1 mg KOH/g in the final polyol.

Examples 3-4 are performed to study the effects of several trans-esterification catalysts, namely, Tyzor® LA, potassium carbonate and with or without tributylamine, at lower reaction temperatures. In these examples, the reaction temperatures are maintained between 180-190° C., which are lower than the reaction temperatures typically used for polyol synthesis using terephthalic acid as primary acid source. The results obtained in Example 3 demonstrate that in addition to the titanate esterification/transesterification catalyst and either with or without the existence of a tertiary amine but with the use of potassium carbonate as catalyst along with an organic carbonate as acid scavenger, the acid number reduction can be performed at temperatures much lower than the temperature used in a normal aromatic polyester polyol production process.

The lignin products that are suitable for use in the lignin-based aromatic polyester polyols preparation may be available from industrial recovery processes either with or without fractionation. The recovery processes may use carbon dioxide as the acid source, for example, as in LignoBoost process. It is preferred that these lignin products have a number-average molecular weight less than 3000 Daltons, more preferably less than 1000 Dalton, and with the molecular weight distribution index of up to about 5.

The lignin products may contain varied hydroxyl groups and acid groups, for example, aliphatic hydroxyl groups, phenolic hydroxyl groups, carboxyl groups, and sulfonic acid or salt. The lignin products may have hydroxyl number ranging from 150 to 600 mg KOH/g.

The following Examples demonstrate the present disclosure and its capability for use. The disclosure is capable of other and different embodiments, and its several details are capable of modifications in various apparent respects, without departing from the spirit and scope of the present disclosure. Accordingly, the Examples are to be regarded as illustrative in nature and non-limiting.

EXAMPLES

Materials Used in the Examples

BioChoice™ Softwood Kraft lignin is produced from LignoBoost process and commercially available from Domtar, Plymouth, N.C. The commercial product contains about 30% of moisture content. This lignin product can be used either with or without pre-drying for polyol production.

HPL lignin is a partially hydroxylproxylated lignin commercially available from Cyclewood Solutions Inc., Dallas, Tex.

Sodium Lignosulfonate salt (NaLS) and ammonium Lginosulfonate salt (ALS) are water soluble lignin products that produced as a byproducts from the wood pulping using sulfite pulping process.

SLRP™ lignin is produced from the sequential liquid-lignin recovery and purification process and available from Liquid lignin Company, Clemson, S.C.

Biolignin™ lignin is a product from straw, available from CIMV, France.

Biolignin™ is claimed as a phenolic polymer with a linear and low molecular weight.

Organosols lignin products were obtained from ECN (Energy Research Centre of the Netherlands, Petten, NL).

COP Acid is a mixture of aliphatic acids containing 10-50% water. The acids in COP acid include butyric acid, valeric acid, caproic acid, succinic acid, glutaric acid, adipic acid and hydroxycaproic acid. The detailed description of COP acid has been disclosed in United States Application No. 20130042659.

Terate® HT 1100 is an aromatic polyester polyol commercially available from INVISTA. This polyol has typical properties as hydroxyl number 248-270 mg KOH/g, acid number less than 2 mg KOH/g, and viscosity 4000-10000 cps at 25° C.

Terate® HT 5100 is an aromatic polyester polyol commercially available from INVISTA. This polyol has typical properties as hydroxyl number 295 mg KOH/g, acid number 1 mg KOH/g, and viscosity 6000 cps at 25° C.

Terate® HT 5336 is an aromatic polyester polyol commercially available from INVISTA. This polyol has typical properties as hydroxyl number 305 mg KOH/g, acid number less than 2 mg KOH/g, and viscosity 6000 cps at 25° C.

Tyzor LA is a commonly used esterification/transesterification catalyst with good water resistance, and is commercially available from Dorf Ketal Specialty Catalysts, LLC, 3727 Greenbriar Drive, Suite 114, Stafford, Tex. 77477.

Potassium carbonate and zinc oxide are inorganic catalysts. Tributylamine is a tertiary amine catalyst.

The term "PC", as used herein, means propylene carbonate, which is an organic carbonate.

Test Methods Used in the Examples

The "hydroxyl value" (OHV) is measured according to a method ASTM D 1638 and reported as mg KOH/g. The OHV reflects the concentration of hydroxyl groups, per unit weight of the polyol composition, that are able to react with the isocyanate groups.

The "acid number" is measured according to standard ASTM 4662-98 (as of 2009) and reported as mg KOH/g. The "acid number" value indicates the concentration of carboxylic acid groups present in the polyol.

The "average functionality" is measured according to a method normally calculated based on initial raw materials.

The "polyol viscosity" is measured according to standard ASTM D4878 at 25° C. and reported as centipoise (cps).

A furnace test is used to determine thermal stability of the polyurethane rigid foams. In this test, the furnace is preheated to 550° C. The foam specimens of 4-inch long, 4-inch wide and ½-inch thick are wrapped with an aluminum foil and then placed in the furnace for 20 min. Weight retention is measured and the char integrity is visually observed. The improved thermal stability of the foam is observed when the weight retention (in % from the initial) is high, and correspondingly, a better char integrity. A better thermal stability is an indication of better flame resistance of the foam.

Example 1: Lignin Dissolution in Aromatic Polyester Polyol

Terate® HT 5100 is mixed with unmodified lignin by means of high shear mixing below 115° C. The properties of the blends and mixing conditions are listed in Table 1 below. The viscosity and acid number of the blends increase with the lignin concentration.

represents the measured viscosity of ammonium lignosulfonate salts in glycol solutions on the y-axis as a function of lignin concentration on the x-axis. The results show that the viscosity of the lignin/glycol solutions increases with the lignin concentration. In FIG. 1, the mixture of glycols "DEG/PEG 400 (40/60)" is a 40:60 blend of diethylene glycol:polyethylene glycol 400. PEG 400 (CAS No. 25322-68-3) is a low molecular weight grade of polyethylene glycol (380-420 g/mole).

Figure 2:
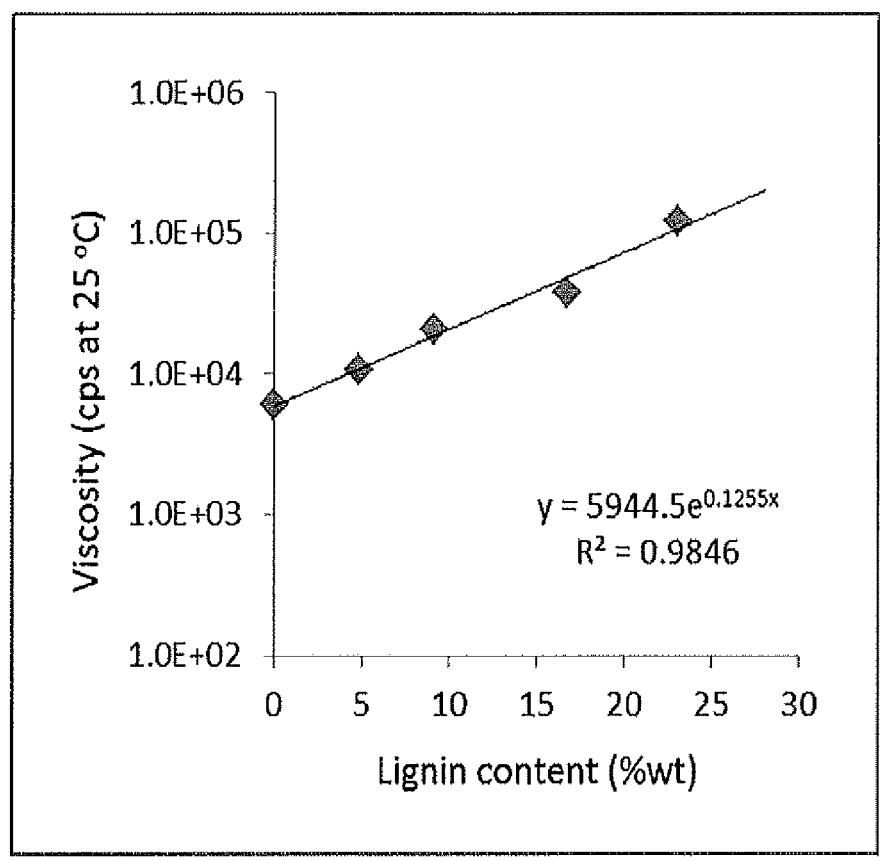
FIG. 2 represents the measured viscosity of the Tetate® HT 5100 polyol/lignin blends, prepared according to the Example 1 method, as a function of the lignin content on the x-axis.

FIG. 2 represents the measured viscosity of the Tetate® HT 5100 polyol/lignin blends, prepared according to the Example 1 method, as a function of the lignin content on the x-axis.

Figure 3:
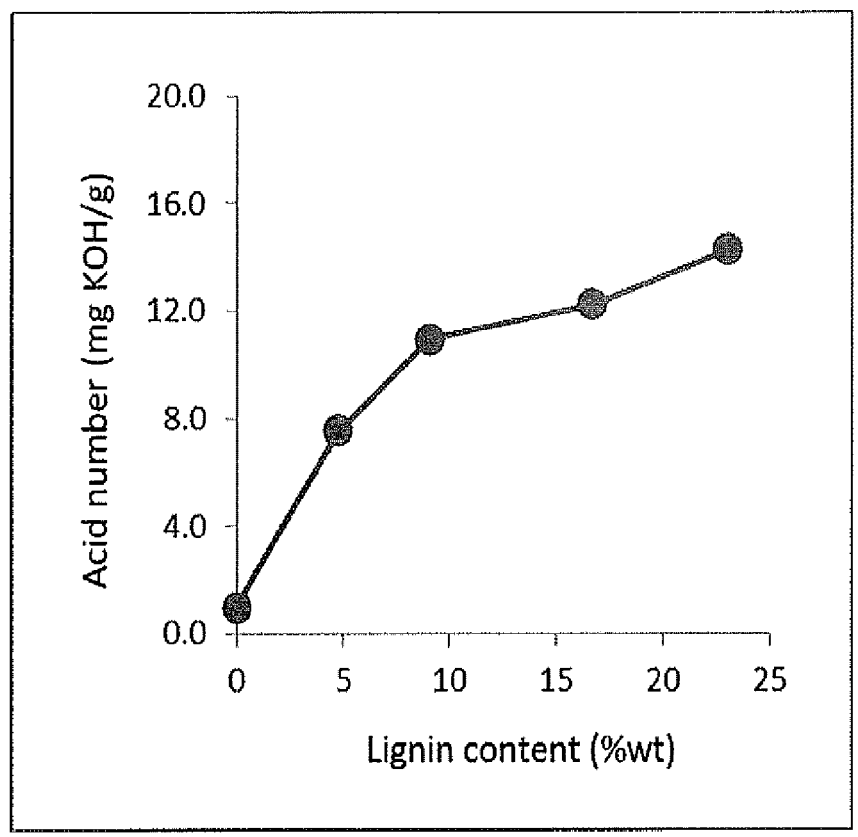
FIG. 3 represents the measured acid number of the Tetate® HT 5100 polyol/lignin blends, prepared according to the Example 1 method, as a function of the lignin content on the x-axis.

FIG. 3 represents the measured acid number of the Tetate® HT 5100 polyol/lignin blends, prepared according to the Example 1 method, as a function of the lignin content on the x-axis.

Example 2

About 300 g of sodium Lignosulfonate is dissolved in the mixture of 400 g of diethylene glycol and 600 g of PEG 600 using a high-shear mixer at ambient temperature. The resulting mixture has hydroxyl number 640 mg KOH/g, acid number 7.5 mg KOH/g, and viscosity 1392 cps at 25° C. The solution is labeled as "NaLS-30".

About 400 g of NaLS-30 is mixed with 75 g of propylene carbonate in a four-necked 2-Liter flask. The mixture temperature is raised to 100° C. and 0.8 g of zinc oxide is added to the mixture. The reaction temperature is gradually raised to 180° C. and maintained between 180° C. and 185° C. An additional 50 g of propylene carbonate is added during the reaction. A lot of bubbles are generated during the reaction and the total amount of propylene carbonate is reached to 182 g. The consumption of carbonate is monitored by FTIR spectrometer (Thermo Scientific Nicolet Model iS5). After about 130 min, almost 95% of the carbonate is consumed.

The final lignin-based polyol has the following characteristics: hydroxyl number 604 mg KOH/g, acid number 1.77 mg KOH/g, and viscosity 532 cps at 25° C.

Example 3

About 600 g of Terate® HTSP-3, having an OHV of 305 mg KOH/g and acid number less than 2 mg KOH/g and viscosity about 6000 cps, is mixed with 200 g of HPL lignin in a four-necked 2-Liter flask. Then 24 g of propylene carbonate, 0.24 g of tributylamine, and 1.6 g of Tyzor LA are charged into the flask at ambient temperature with the

TABLE 1

Acid number and viscosity increases with lignin concentration

| HT 5100 | Control | Lignin Blend | | | |
| --- | --- | --- | --- | --- | --- |
| | | 1 | 2 | 3 | 5 |
| Ligning (Domtar, % wt) | 0 | 4.8 | 9.1 | 16.7 | 23.1 |
| RPMs | | 15200 | 15200 | 17800 | 19400 |
| Temperature (° C.) | | 103 | 102 | 95 | 114 |
| Hydroxyl number (mg KOH/g) | 295 | 292 | 287 | 302 | 375 |
| Acid number (mg KOH/g) | 1 | 7.55 | 10.96 | 12.25 | 14.29 |
| Vicosity (cps at 25° C.) | 6000 | 10620 | 20840 | 38110 | 122200 |

The lignin products may be solubilized in glycols, namely, ethylene glycol (EG), diethylene glycol (DEG), and the mixture of glycols, and using high shear mixing. FIG. 1 nitrogen purge. The initial acid number of the mixture is 6.30 mg KOH/g. Reaction temperature is raised gradually. After the reaction temperature is reached 160° C. the acid number decreases to 4.25 mg KOH/g. The temperature is further raised continuously and maintained between about 170-180° C. for 5 hours. The polyol acid number reduction is slow and reaches 3.94 mg KOH/g. Propylene carbonate is added at this time followed by 15 g of glycerin. The acid number does not go down for another 2 hours. Then 1 g of potassium carbonate is added at 180° C. and the acid number is reduced rapidly from 3.52 to 0.75 mg KOH/g.

The resultant aromatic polyester polyol has OHV 330 mg KOH/g, viscosity 15400 cps at 25° C., and acid number 0.75 mg KOH/g.

Example 4

About 600 g of Terate® HTSP-3, having an OHV of 305 mg KOH/g and acid number less than 2 mg KOH/g and viscosity about 6000 cps, is mixed with 200 g of HPL lignin in a four-necked 2-Liter flask. Then 40 g of ethylene glycol, 10 g of propylene carbonate, 2 g of potassium carbonate, and 1.6 g of Tyzor LA are charged into the flask at ambient temperature with nitrogen purge. The initial acid number of the mixture is 4.67 mg KOH/g. The reaction temperature is raised gradually. After the reaction temperature has reached 160° C. the acid number reduces to 2.17 mg KOH/g. The temperature is raised continuously from 160 to 170° C. in about 1 hour. The acid number of the polyol reduces to 1.20 mg KOH/g.

The resultant aromatic polyester polyol has OHV 389 mg KOH/g, viscosity 7045 cps at 25° C., and acid number 1.20 mg KOH/g.

Figure 4:
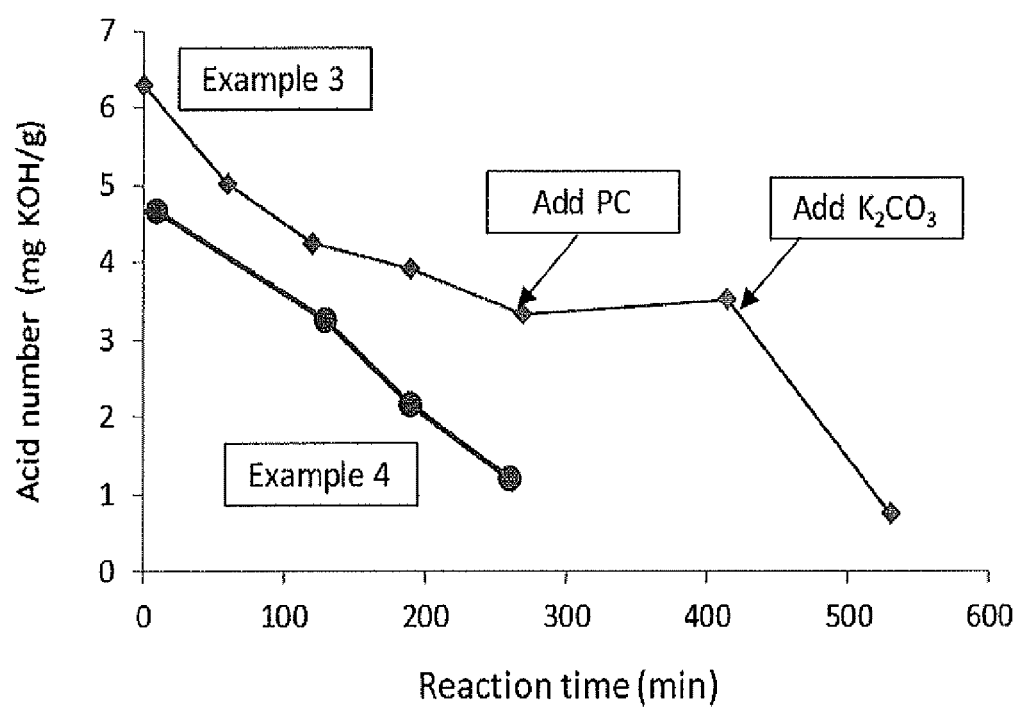
FIG. 4 represents the measured acid number reduction during the methods of Example 3 and Example 4.

FIG. 4 represents the measured acid number reduction during the methods of Example 3 and Example 4. It is demonstrated that, with the use of potassium carbonate as catalyst along with organic carbonate as acid scavenger, the acid number reduction can be performed at temperatures much lower than the temperature used in a normal aromatic polyester polyol production process.

Example 5

About 439 g of terephthalic acid, 167 g of phthalic anhydride, 80 g of COP acid (dehydrated), 370 g of diethylene glycol, 154 g of triethylene glycol, and 0.5 g of Tyzor LA are mixed at ambient in a four-necked 5-Liter flask with nitrogen purge. The reaction temperature is gradually raised to 235° C. for a few hours. After the mixture turns homogenous and transparent liquid, the acid number is measured to be 36.4 mg KOH/g. The reaction temperature is maintained and 400 g of lignin (LignoBoost lignin from Domtar)/diethylene glycol solution, which is previously prepared to contain 50% lignin by weight, is added slowly to the flask with regular mixing speed. After the temperature is reduced to 190° C., it is maintained between 190 to 205° C. and 41 g grams of glycerin is added to the mixture. The acid number of the polyol reduces to 4.93 mg KOH/g in about 6 hours. Then 40 g of propylene carbonate and 1 g of potassium carbonate are added followed by 60 g of diethylene glycol. At about 185° C. the acid number reduces to 0.92 mg KOH/g in about 2 hours.

The resultant aromatic polyester polyol has OHV 305 mg KOH/g, viscosity 12570 cps at 25° C., and acid number 0.66 mg KOH/g.

Example 6

About 439 g of terephthalic acid, 168 g of phthalic anhydride, 80 g of COP acid (dehydrated), 480 g of diethylene glycol, 155 g of triethylene glycol, and 0.5 g of Tyzor LA are mixed at ambient in a four-necked 5-Liter flask. The reaction temperature is gradually raised to 240° C. for a few hours. After the mixture turns homogenous and transparent liquid, the acid number is measured to be 18.3 mg KOH/g. The reaction temperature is maintained until the acid number of the polyol reaches 2.2 mg KOH/g. Then 200 g of lignin (LignoBoost lignin from Domtar) is added slowly to the flask with regular mixing speed. After the temperature reduces to 190° C., it is maintained between 190-200° C. When the addition of the lignin is completed, the acid number of the reaction mixture is measured to be 9.0 mg KOH/g. Then 50 g of propylene carbonate and 2 g of potassium carbonate are added followed by 42 g of diethylene glycol for OHV adjustment. The acid number of the polyol is reduced to 0.88 mg KOH/g in about 5 hours.

The resultant aromatic polyester polyol has OHV 260 mg KOH/g, viscosity 53300 cps at 25° C., and acid number 0.88 mg KOH/g.

The polyol, prepared according to the Example 6 method, is then blended with PEG 600 at varied concentrations. The resultant polyols of Table 2 below have the following OHV very close to each other but have significantly reduced viscosity.

TABLE 2

| lignin polyol [of Example 6]/PEG-600 Blends | | | |
|---|---|---|---|
| Polyol blend | PEG600 concentration (% wt) | Hydroxyl number (OHV, mg KOH/g) | Viscosity (cps at 25° C.) |
| 1 | 2.5 | 259 | 45300 |
| 2 | 4.8 | 249 | 31370 |
| 3 | 7.0 | 244 | 15680 |
| 4 | 9.1 | 240 | 14900 |

Example 7

About 405 g of terephthalic acid, 154 g of phthalic anhydride, 74 g of COP acid (dehydrated), 530 g of diethylene glycol, 143 g of triethylene glycol, and 0.5 g of Tyzor LA are mixed at ambient in a four-necked 5-Liter flask with nitrogen purge. The reaction temperature is gradually raised to 240° C. for a few hours. After the mixture turns homogenous and transparent liquid, the acid number is measured to be 11.2 mg KOH/g. The reaction temperature is maintained until the acid number of the polyol reaches 2.40 mg KOH/g. Then 226 g of lignin (LignoBoost lignin from Domtar) is added slowly to the flask with regular mixing speed. After the temperature is reduced to 190° C., it is maintained between 190-200° C. When the addition of the lignin is completed, the acid number of the reaction mixture is 9.0 mg KOH/g. Then 50 g of propylene carbonate and 2 g of potassium carbonate are added followed by 24 g of glycerin and 24 g of diethylene glycol. The acid number of the polyol is reduced to 1.35 mg KOH/g in about 4 hours. The resultant aromatic polyester polyol has OHV 300 mg KOH/g, viscosity 23100 cps at 25° C., and acid number 0.90 mg KOH/g.

The polyol, prepared according to the Example 7 method, is then blended with PEG 600 at varied concentrations. The resultant polyols of Table 3 below have the following OHV very close to each other but have significantly reduced viscosity.

TABLE 3 lignin polyol [of Example 7]/PEG-600 Blends

| Polyol blend | PEG600 concentration (% wt) | Hydroxyl number (OHV, mg KOH/g) | Viscosity (cps at 25° C.) |
|---|---|---|---|
| 1 | 2.5 | 300 | 18200 |
| 2 | 4.8 | 299 | 14700 |
| 3 | 7.0 | 301 | 10990 |
| 4 | 9.1 | 291 | 6983 |

Example 8: Foam Properties

Polyurethane rigid foams are made with regular lab-scale procedure by mixing equal weight of polyol blend with a polyisocyanate (Rubinate M from Huntsman) at 18° C. Table 4 below gives a summary of the reactivity and compressive strength for the foams made using a 32-oz cup.

TABLE 4

Cup foam reactivity

| Polyol (Cup Foam) | HT5100 | Example 3 (6639-43) | Example 4 (6639-44) | Example 5 (6639-58) | Example 6 (6639-63) | Example 7 (6639-65) |
|---|---|---|---|---|---|---|
| Density (pcf) | | | | | | |
| Core | 1.51 | 1.50 | 1.56 | 1.47 | 1.55 | 1.46 |
| Reactivity (sec) | | | | | | |
| Cream time | 5 | 5 | 5 | 6 | 5 | 5 |
| Gel time | 10 | 11 | 11 | 13 | 13 | 9 |
| Tack-free time | 13 | 13 | 12 | 17 | 14 | 14 |
| Compressive strength (psi) | | | | | | |
| Perpentecullar | 5.5 | 4.7 | 4.5 | 4.1 | 5.3 | 3.7 |
| Parallel | 13.3 | 14.6 | 13.5 | 12.1 | 10.2 | 9.9 |

The polyol blend (B-side) is composed of 40 g lignin-based polyol (or the control polyol), 17.9 g Munich-based polyether polyol, 5.1 g sucrose-based polyether polyol, 6.3 g brominated reactive FR polyol, 4.5 g non-reactive flame retardant, 1.0 g silicon surfactant, 3.79 g amine catalysts, 0.09 g metal catalyst, 1.6 g water and 9.83 g Solstice LBA. Cup test (Table 4) shows that the low-acidity, lignin-based aromatic polyester polyols, according to the present disclosure, offer foams having similar reactivity and compressive strength compared with a commercially available Terate® HT polyol.

Table 5 below gives a summary of the foam properties including reactivity from the pour-in-place box foams.

TABLE 5

Properties from pour-in-place box foams

| Polyol (Cup Foam) | HT5100 | Example 3 (6639-43) | Example 4 (6639-44) | Example 5 (6639-58) | Example 6 (6639-63) | Example 7 (6639-65) |
|---|---|---|---|---|---|---|
| Density (pcf) | | | | | | |
| Core | 1.68 | 1.68 | 1.66 | 1.68 | 1.58 | 1.70 |
| Reactivity (sec) | | | | | | |
| Cream time | 33 | 39 | 39 | 38 | 31 | 35 |
| Gel time | 117 | 114 | 104 | 127 | 112 | 106 |
| Tack-free time | 156 | 154 | 125 | 146 | 151 | 146 |
| End of rise | 139 | 143 | 114 | 132 | 141 | 126 |
| k-factor | | | | | | |
| Initial | 0.140 | 0.139 | 0.142 | 0.142 | 0.145 | 0.148 |
| Compressive strength (psi) | | | | | | |
| Perpentecullar | 7.5 | 7.3 | 9.2 | 7.4 | 6.2 | 6.6 |
| Parallel | 24.5 | 24.8 | 23.9 | 24.3 | 20.8 | 23.7 |
| Furance Test, Weight retention (%) | | | | | | |
| 550° C./20 min | 16 | 20 | 25 | 29 | 29 | 26 |

Figure 5:
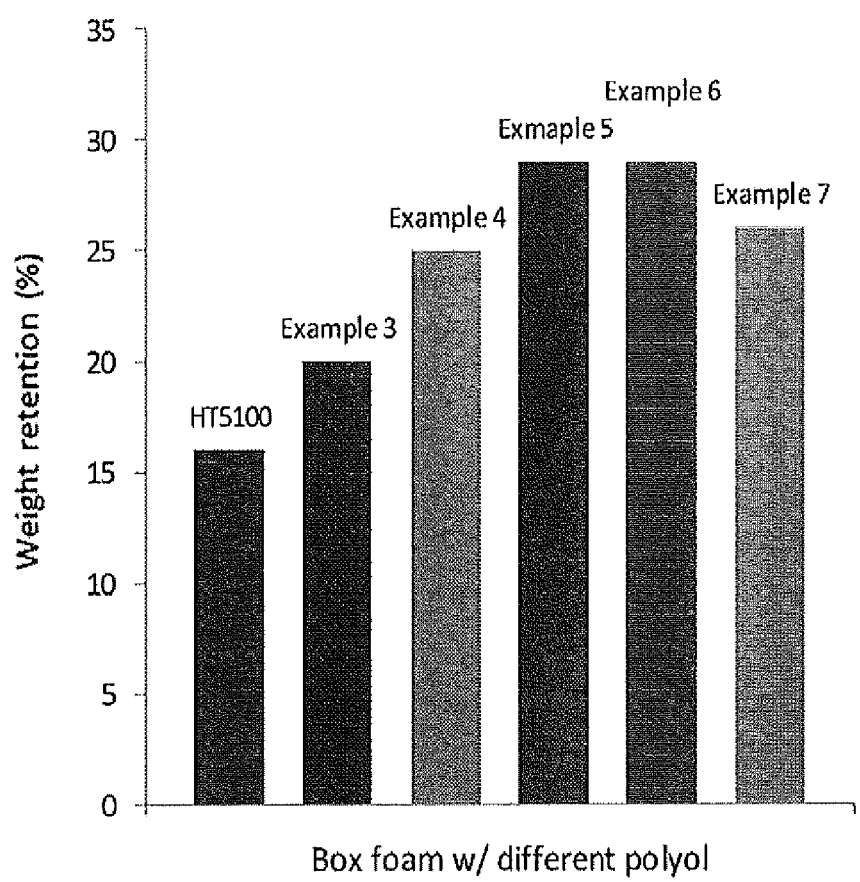
FIG. 5 represents the weight retention of rigid polyurethane foams (containing disclosed lignin-containing aromatic polyester polyols) as determined from the furnace test at 550° C. for 20 min.

The polyol blend (B-side) is composed of 151.4 g lignin-based polyol (or the control polyol), 70 g sucrose-based polyether polyol, 45.5 g brominated reactive FR polyol, 28 g non-reactive flame retardant, 5.3 g silicon surfactant, 3.15 g amine catalysts, 3.2 g metal catalyst, 8.4 g water, and 35 g of 245 fa. The polyol blends are reacted with 350 g of polyisocyanate for foaming. The results demonstrate that the polyols, prepared according to the Example 4 and Example 7 methods, have improved reactivity. The foams made from these lignin-based aromatic polyester polyols have similar k-factor and mechanical strength. It is interesting and surprising that the foams from lignin-based polyols show much higher weight retention from the furnace test (FIG. 5). This implies the lignin-based polyols may provide the potential of improving flame resistance for polyurethane rigid foams.

In FIG. 5, the weight retention of the rigid polyurethane foams is determined from the furnace test at 550° C. for 20 min. The foams made from lignin-based polyols also show better char integrity compared with the one made from the control (Terate® HT 5100 polyol). The result indicates that the polyurethane rigid foams made from lignin-based aromatic polyester polyols may provide the potential improvements in the flame resistance for these foams.

While the illustrative embodiments of the disclosure have been described with particularity, it will be understood that various other modifications will be apparent to and may be readily made by those skilled in the art without departing from the spirit and scope of the disclosure. Accordingly, it is not intended that the scope of the claims hereof be limited to the examples and descriptions set forth herein but rather that the claims be construed as encompassing all the features of patentable novelty which reside in the present disclosure, including all features which would be treated as equivalents thereof by those skilled in the art to which the disclosure pertains.

EMBODIMENTS OF THE PRESENT DISCLOSURE

An aromatic polyester polyol comprising lignin in the polyol backbone.

The lignin-containing aromatic polyester polyol comprises;
(i) an aromatic acid source, such as from the group consisting of terephthalic acid, industrial recycled terephthalic acid, isophthalic acid, phthalic anhydride, polyethylene terephthalate (PET), recycled PET, and mixtures thereof, with or without containing fatty acid chains;
(ii) a glycol component chosen from ethylene glycol, diethylene glycol, triethylene glycol, tetraethylene glycol, polyethylene glycol of number average molecular weight less than 1000 and their mixtures;
(iii) an aliphatic acid source, for example, $C_4$-$C_6$ diacids such as succinic acid, glutaric acid, adipic acid, COP acid, non-volatile residue (NVR). COP acid and NVR are by-product streams obtained from a cyclohexane oxidation process for making adipic acid;
(iv) branch units, such as, poly-functional alcohols, for example, glycerin, pentaerythitol, sorbitol, their mixtures and byproducts from the manufacturing process, for example, recycled grade crude glycerin from biodiesel production;
(v) a fatty acid component present in up to 25% by weight, for example, TOFA and vegetable oils;
(vi) lignin, either chemically modified or chemically unmodified, in an amount 5-30% by weight relative to the total composition; and
(vii) an acid scavenger in less than 10% by weight, an inorganic catalyst in less than 2% by weight and 0-5% of tertiary amine catalyst.

The lignin-based polyol composition may include polyether polyol, prepared from the ring-opening process of ethylene oxide and propylene oxide, for example, polyethylene glycols of number average molecular weight less than 2000 and poly(ethylene-co-propylene) glycols.

The lignin-containing polyol having the properties of hydroxyl number between 100 to 800 mg KOH/g, viscosity range between 500 to 30000 cps at 25° C., and acid number less 3 mg KOH/g, preferably less than 2, and most preferably less than 1 mg KOH/g.

The polyol component may have the acid number less than 10 mg KOH/g, preferably less than 5 mg KOH/g, and most preferably less than 2 mg KOH/g.

The lignin products are commercially available from any chemical recovery process. A non-limiting example is Kraft lignin or Sulfonated lignin.

A method of preparing lignin-based aromatic polyester polyol. The method comprising; (1) dissolving lignin in the mixture of polyether and aromatic polyester polyol at elevated temperature, optionally, by means of high shear mixing, and (2) reacting the mixture with an acid scavenging agent and inorganic catalyst with or without the existence of a tertiary amine catalyst for the acid number reduction from above 5 to less than 2 mg KOH/g in a reasonable time scale and in the reaction temperature ranging from about 100° C. to about 200° C.

The acid scavenging agent may be chosen from urea, KOH, ammonia, organic carbonates, and industrial acid neutralizers. The organic carbonate may be chosen from the group consisting of ethylene carbonate, propylene carbonate, glycerol carbonate and the mixtures thereof. Propylene carbonate is a preferred acid scavenging agent.

The inorganic catalyst may be chosen from metal oxides, inorganic carbonates, etc. The catalyst is preferably zinc oxide, inorganic carbonates, such as sodium bicarbonate and potassium bicarbonate. Potassium carbonate is a preferred inorganic carbonate for use as a catalyst. The tertiary amine catalyst may be chosen from the compounds containing hydroxyl group or without any reactive groups. The catalyst is preferably triethanolamine, trimethylamine, imidazole, tributyl amine.

A polyurethane foam, prepared using the lignin-containing polyol with either hydrofluorocarbon/water as co-blowing agent or water as the sole blowing agent. The foam having the density in the range of about 0.3 to about 6 pounds per cubic feet.

The lignin-based aromatic polyester polyols may be suitable to produce polyurethane rigid foams with NCO/OH index from 100 to 350, and foam density from 1 pound per cubic feet to approximately 6 pound per cubic feet. Such industrial processes as spray, pour in place, slab or lamination processes may be used for the foam preparation. The polyurethane may have improved reactivity, mechanical property, and thermal resistance.

The lignin-based aromatic polyester polyol may be suitable to produce non-foam polyurethane materials, for example, coating for controlled-release fertilizer with an elongated release period.

A pour-in-place (box) polyurethane rigid foam with the weight retention of at least 20%, measured by the furnace test (550° C./20 min), prepared from the lignin-based aromatic polyester polyol of the present disclosure.

The invention claimed is:

1. A process for making aromatic polyester polyol containing from 0.5 to 30 weight percent lignin comprising:
   a. contacting a reaction mixture comprising
      i. an aromatic acid source selected from the group consisting of terephthalic acid, isophthalic acid, phthalic anhydride, polyethylene terephthalate (PET) and mixtures thereof,
      ii. a glycol component selected from the group consisting of ethylene glycol, diethylene glycol, triethylene glycol, tetraethylene glycol, polyethylene glycol and their mixtures,
      iii. at least one selected from the group consisting of aliphatic diacids and hydroxyl-terminated aliphatic acids,
      iv. at least one functional reactant selected from glycerin, pentaerythritol, sorbitol, polyglycerin, tall oil fatty acids, vegetable oil triglycerides, monoester fatty acids, aliphatic diacids, hydroxyl aliphatic acids, and their mixtures at temperature from 230° C. to 240° C. in the absence of lignin to form an intermediate reaction product mixture;
   b. adding lignin, lignin incorporation catalyst and propylene carbonate to the intermediate reaction product mixture of (a) and controlling the reaction temperature at 160° C. to 205° C.; and
   c. recovering lignin-containing aromatic polyester polyol from the reaction mixture.

2. The process of claim 1 wherein the lignin-containing polyester polyol recovered in step (c) has an as-produced acid number of less than 2 mg KOH/g.

3. The process of claim 1 wherein the aromatic acid source is a recycled or off-spec material.

4. The process of claim 1 further comprising adding organic carbonate to step (a).

5. The process of claim 1 wherein step (b) further comprises adjusting temperature of the intermediate reaction product mixture to 160° C. to 205° C. before adding lignin, lignin incorporation catalyst and propylene carbonate.

6. The process of claim 5 wherein the temperature range of step (b) is 170° C. to 180° C.

7. The process of claim 5 wherein step (c) further comprises adding a glycol component selected from the group consisting of ethylene glycol, diethylene glycol, triethylene glycol, tetraethylene glycol, polyethylene glycol and their mixtures to reduce viscosity of the recovered material.

8. The process of claim 4 wherein the organic carbonate is selected from the group consisting of propylene carbonate, ethylene carbonate and glycerol carbonate.

9. The process of claim 8 wherein the organic carbonate is propylene carbonate.

10. The process of claim 1 wherein the lignin incorporation catalyst is selected from inorganic carbonates and metal oxides.

11. The process of claim 10 wherein the inorganic carbonate is an alkyl metal carbonate.

12. The process of claim 11 wherein the alkyl metal carbonate is potassium carbonate or sodium carbonate.

13. The process of claim 10 wherein the metal oxide is zinc oxide.

14. The process of claim 1 wherein the lignin addition step (b) comprises mixing 5 to 30 weight percent lignin (based on the weight of the finished lignin-containing polyester polyol) with the intermediate reaction product mixture of step (a).

15. An aromatic polyester polyol containing from 0.5 to 30 weight percent lignin having an as-produced acid number of less than 2 mg KOH/g.

16. The aromatic polyester polyol of claim 15 that has not been subjected to post-synthesis treatment to reduce its acid number.

17. The aromatic polyester polyol of claim 16 that is produced without mechanically dispersing a discontinuous phase of solid lignin particles into a continuous phase of polyester polyol.

18. Foam comprising the aromatic polyester polyol of claim 1.

19. A method for improving the flame resistance of a foam comprising incorporating into the foam an aromatic polyester polyol of claim 1.

* * * * *